(12) United States Patent
Guio

(10) Patent No.: US 6,685,209 B1
(45) Date of Patent: Feb. 3, 2004

(54) BOAT TRAILER

(76) Inventor: Jack J. Guio, 617 Madison Ct., Sarasota, FL (US) 34235

( * ) Notice: Subject to any disclaimer, the term of this patent is extended or adjusted under 35 U.S.C. 154(b) by 0 days.

(21) Appl. No.: 10/395,562

(22) Filed: Mar. 24, 2003

(51) Int. Cl.$^7$ .................................................. B60P 3/10
(52) U.S. Cl. ..................................... 280/414.1; 280/482
(58) Field of Search ............................. 280/414.1, 482, 280/491.3; D12/162

(56) References Cited

U.S. PATENT DOCUMENTS

| | | |
|---|---|---|
| 2,386,195 A | 10/1945 | Clark |
| 2,894,766 A | 7/1959 | Habriga |
| 3,032,353 A | 5/1962 | Williams et al. |
| 3,083,986 A | 4/1963 | Moody et al. |
| 3,102,737 A | 9/1963 | Williams et al. |
| 3,142,494 A | 7/1964 | Kelley |
| 3,154,325 A | 10/1964 | Thompson et al. |
| 3,326,573 A * | 6/1967 | Neitzey ...................... 280/482 |
| 3,979,138 A | 9/1976 | George et al. |
| 3,984,121 A | 10/1976 | Dobosi |
| 3,989,266 A | 11/1976 | Foster |
| 4,169,611 A | 10/1979 | Smith et al. |
| 4,407,519 A | 10/1983 | Heyser |
| 4,623,161 A * | 11/1986 | Sprague ................... 280/414.1 |
| 4,687,219 A | 8/1987 | Rendzio |
| 5,011,177 A | 4/1991 | Grice |
| 5,108,121 A | 4/1992 | Collis |
| 5,114,168 A | 5/1992 | Kehl |
| 5,520,494 A | 5/1996 | Hughes |
| 6,302,425 B1 | 10/2001 | Springer |
| 6,443,474 B1 | 9/2002 | Kay |
| 6,488,307 B2 * | 12/2002 | Koon ...................... 280/491.1 |

* cited by examiner

Primary Examiner—Lesley D. Morris
Assistant Examiner—Matthew Luby
(74) Attorney, Agent, or Firm—Charles J. Prescott

(57) ABSTRACT

A boat trailer having a multi-wheel supported frame and an extendable tongue which facilitates launching a boat into the water. A tongue member has a rear portion connected to and forwardly extending from the frame and a forward portion adapted for releasable connection to a trailer hitch of a tow vehicle. A tongue extension includes two extension members pivotally connected together to a central connecting member and pivotally connected at a corresponding opposite end of each extension member between the forward and rear portions. The extension members are pivotally movable between the upright side-by-side stored position and the deployed position in end-to-end fashion and longitudinally aligned with the forward and rear portions wherein the effective length of the tongue member is extended by an amount equal to the combined length of the extension members.

10 Claims, 3 Drawing Sheets

BOAT TRAILER

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to boat trailers, and more particularly to a boat trailer with an extendable tongue for facilitating the launching and loading of a boat without having to place the tow vehicle in proximity to the water.

2. Description of Related Art

The launching and retrieving of a boat from and onto a boat trailer is accomplished at a boat ramp. Such boat ramps typically have a sloped surface leading to the water onto which the boat trailer and tow vehicle must be positioned with the boat trailer sufficiently in the water to effect launching of the boat therefrom. However, the ramp surface may be irregular or even slippery causing the tow vehicle to lose traction when attempting to retrieve the boat atop the trailer from the water. Additionally, where the boat ramp is sufficiently shallow in slope, the tow vehicle may even have to become partially submerged at its rear wheels to position the boat trailer in sufficiently deep water to effect launching of the boat therefrom.

One answer to this problem of the tow vehicle getting too close to, or even submerged into, the water is to provide an extendable tongue of the boat trailer which effectively extends the distance between the tow vehicle and the boat trailer and boat thereon. A number of prior art patents disclose various forms of trailer extension inventions as shown in the following U.S. Patents:

U.S. Pat. No. 2,386,195 to Clark
U.S. Pat. No. 2,894,766 to Habriga
U.S. Pat. No. 3,032,353 to Williams et al.
U.S. Pat. No. 3,083,986 to Moody et al.
U.S. Pat. No. 3,102,737 to Williams et al.
U.S. Pat. No. 3,142,494 to Kelley
U.S. Pat. No. 3,514,325 to Thompson et al.
U.S. Pat. No. 3,979,138 to George et al.
U.S. Pat. No. 3,984,121 to Dobosi
U.S. Pat. No. 3,989,266 to Foster
U.S. Pat. No. 4,169,611 to Smith et al.
U.S. Pat. No. 4,407,519 to Heyser
U.S. Pat. No. 4,687,219 to Rendzio
U.S. Pat. No. 4,913,451 to Woodall
U.S. Pat. No. 5,011,177 to Grice
U.S. Pat. No. 5,108,121 to Collis
U.S. Pat. No. 5,114,168 to Kehl
U.S. Pat. No. 5,520,494 to Hughes
U.S. Pat. No. 6,302,425 to Springer
U.S. Pat. No. 6,443,474 to Kay Many of these above-referenced prior art disclosures teach various forms of telescopically extendable trailer tongues with various actuation means to effect the lengthening and shortening thereof. A few of these references also disclose an auxiliary tongue extension which is carried on the boat trailer and then placed into service when launching and retrieving a boat to effectively increase the length of the trailer tongue to prevent the tow vehicle from being positioned too close to the water to effect launching and retrieval.

The present invention provides a unique, ever-ready-for-use tongue extension which is very easily deployed while maintaining full stability and control of the trailer as deployment is effected and afterward, while towing the boat trailer.

BRIEF SUMMARY OF THE INVENTION

This invention is directed to a boat trailer having a multi-wheel supported frame and an extendable tongue which facilitates launching a boat into the water. A tongue member has a rear portion connected to and forwardly extending from the frame and a forward portion adapted for releasable connection to a trailer hitch of a tow vehicle. A tongue extension includes two extension members pivotally connected together to a central connecting member and pivotally connected at a corresponding opposite end of each extension member between the forward and rear portions. The extension members are pivotally movable between the upright side-by-side stored position and the deployed position in end-to-end fashion and longitudinally aligned with the forward and rear portions wherein the effective length of the tongue member is extended by an amount equal to the combined length of the extension members.

It is therefore an object of this invention to provide a boat trailer having a uniquely configured extension for the tongue of the boat trailer to facilitate launching and reloading of a boat in water without having to submerge a portion of the tow vehicle.

Still another object of this invention is to provide an extension for the tongue of a boat trailer which is in ready position for deployment in extending the length of the tongue of the boat during launching and boat retrieval and which provides trailer stability when towed by the tow vehicle.

In accordance with these and other objects which will become apparent hereinafter, the instant invention will now be described with reference to the accompanying drawings.

BRIEF DESCRIPTION OF THE SEVERAL VIEWS OF THE DRAWING(S)

DETAILED DESCRIPTION OF THE INVENTION

Figure 1:
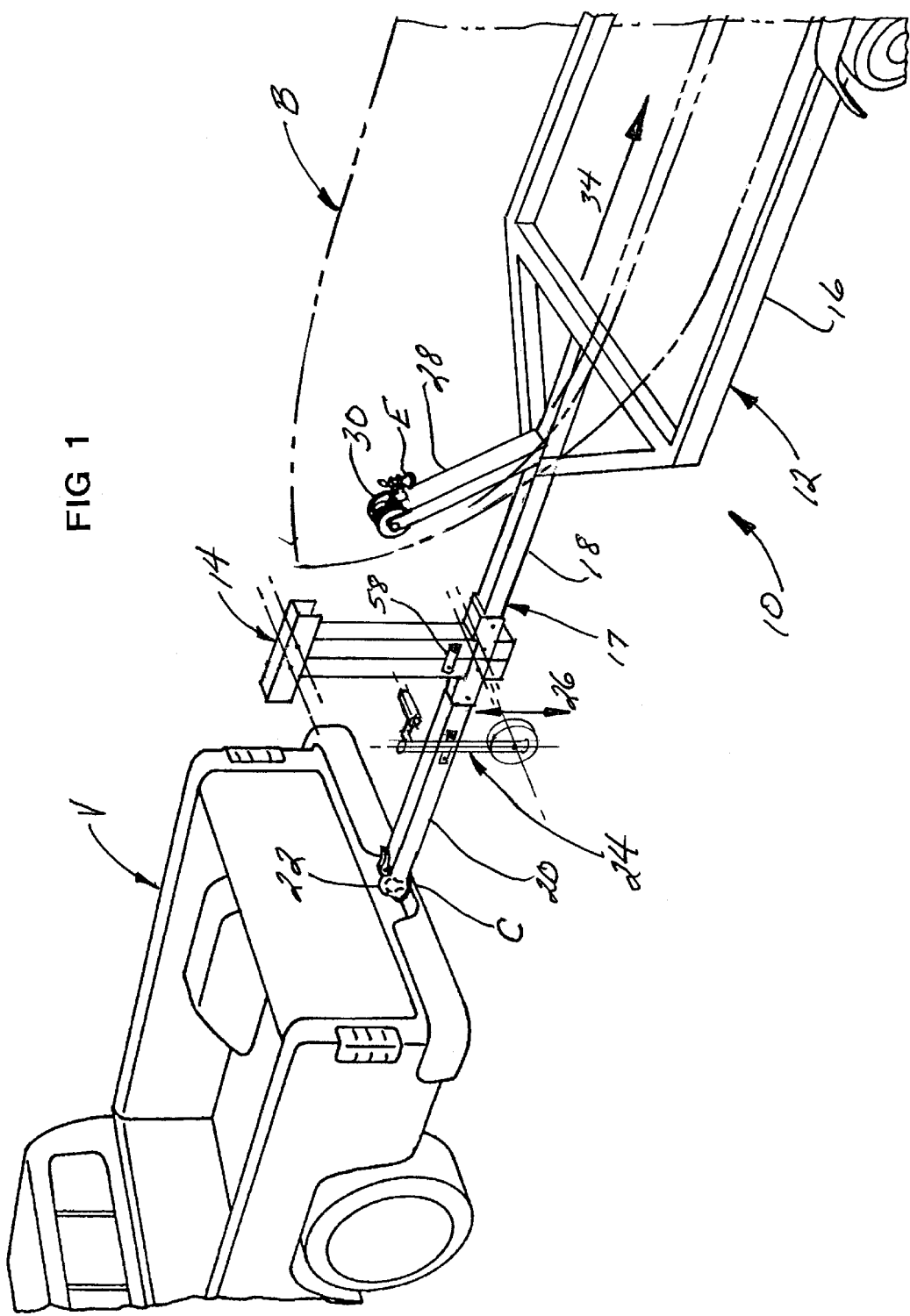
FIG. 1 is a perspective view of one embodiment of the invention in use in conjunction with a tow vehicle and a boat atop the boat trailer.

Referring now to the drawings, one embodiment of the invention is shown generally at numeral 10 in FIG. 1. The boat trailer 10 includes a conventional frame 12 formed of welded channel members shown typically at 16. Support and stabilization pads attached to the frame 12 (not shown) stabilize and maintain a boat B shown in phantom atop the trailer 10. A winch support 28 having a manual or power winch 30 attached to an upper end thereof includes an elongated cable attached to the eye E of the boat B for launching and retrieval and securement of the boat B atop the trailer 10 in a conventional manner.

Figure 2:
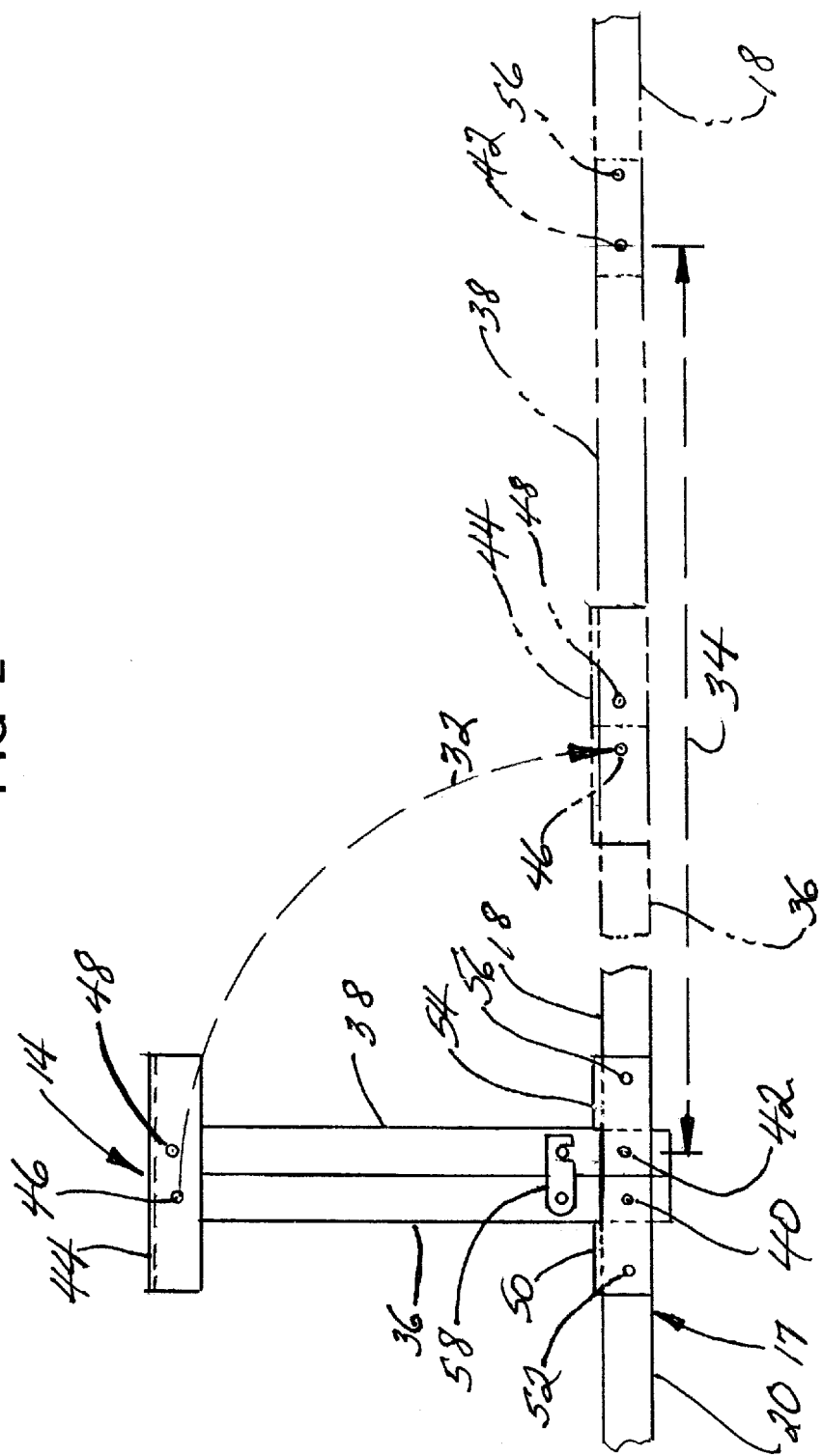
FIG. 2 is a side elevation view of a portion of FIG. 1 showing the deployed configuration in phantom.

The boat tongue shown generally at numeral 17 in FIGS. 1 and 2 includes a rearward portion 18 which is attached to or integral with the forward portion of frame 12. This rear portion 18 is generally centrally positioned and longitudinally extending from a longitudinal axis of the frame 12. The tongue member 17 also includes a forward portion 20 which is generally aligned axially with the rear portion 18 and includes ball member 22 which is releasably attachable to the ball C of a conventional trailer hitch attached to the rear portion of a tow vehicle V. Note that all forms of trailer hitch coupling members are envisioned to be within the scope of this invention.

Referring additionally to FIG. 2, a tongue extension 14 is also provided. This tongue extension 14 includes two elongated substantially equal in length extension members 36 and 38 formed of channel material. One end, (the upper end) of each of the extension members 36 and 38 is pivotally connected together to a channel-shaped central connecting member 44 about pivotal axes 46 and 48 which are generally parallel and transverse to the length of the tongue member 17.

The other end of each of the tongue extensions 36 and 38 is pivotally connected to the corresponding rearward end of the forward portion 20 at 40 and to the forward end of the rear portion 18 at 42. Strengthening members 50 and 54 formed of U-shaped channel material are rigidly connected by bolts 52 and 56 to the forward and rear portions 20 and 18, respectively as shown.

When in the stored not-in-use position, the extension members 36 and 38 are folded together and positioned uprightly within an upright plane which also passes through the tongue member 17. A latch mechanism 58 maintains the stored position by preventing the extension members 36 and 38 from separating at the lower portions thereof.

Upon deployment, the central connecting member 46 pivots in the direction of arrow 32 after the latch 58 is released. This may be accomplished by simply driving the tow vehicle forwardly to accomplish deployment. Upon deployment, the two extension members 36 and 38 pivotally move to a generally horizontal, longitudinally aligned end-to-end abutting orientation as shown in phantom in FIG. 2. The forward and rearward portions 20 and 18, respectively, are also longitudinally aligned as they are separated to effect full deployment. To prevent the extension members 36 and 38 from overextending or pivoting below a longitudinal alignment arrangement, the top portions of the central connecting member 44 bear against the corresponding top portions of each end portion of each of the extension members 36 and 38 as shown.

By this arrangement, the effective length of the tongue member 17 increases an amount equal to numeral 34 equal to the total length of both extension members 36 and 38 wherein the pivotal connector at 42 moves a distance equal to 34 to the position shown in phantom to effect this lengthening feature.

Figure 3:
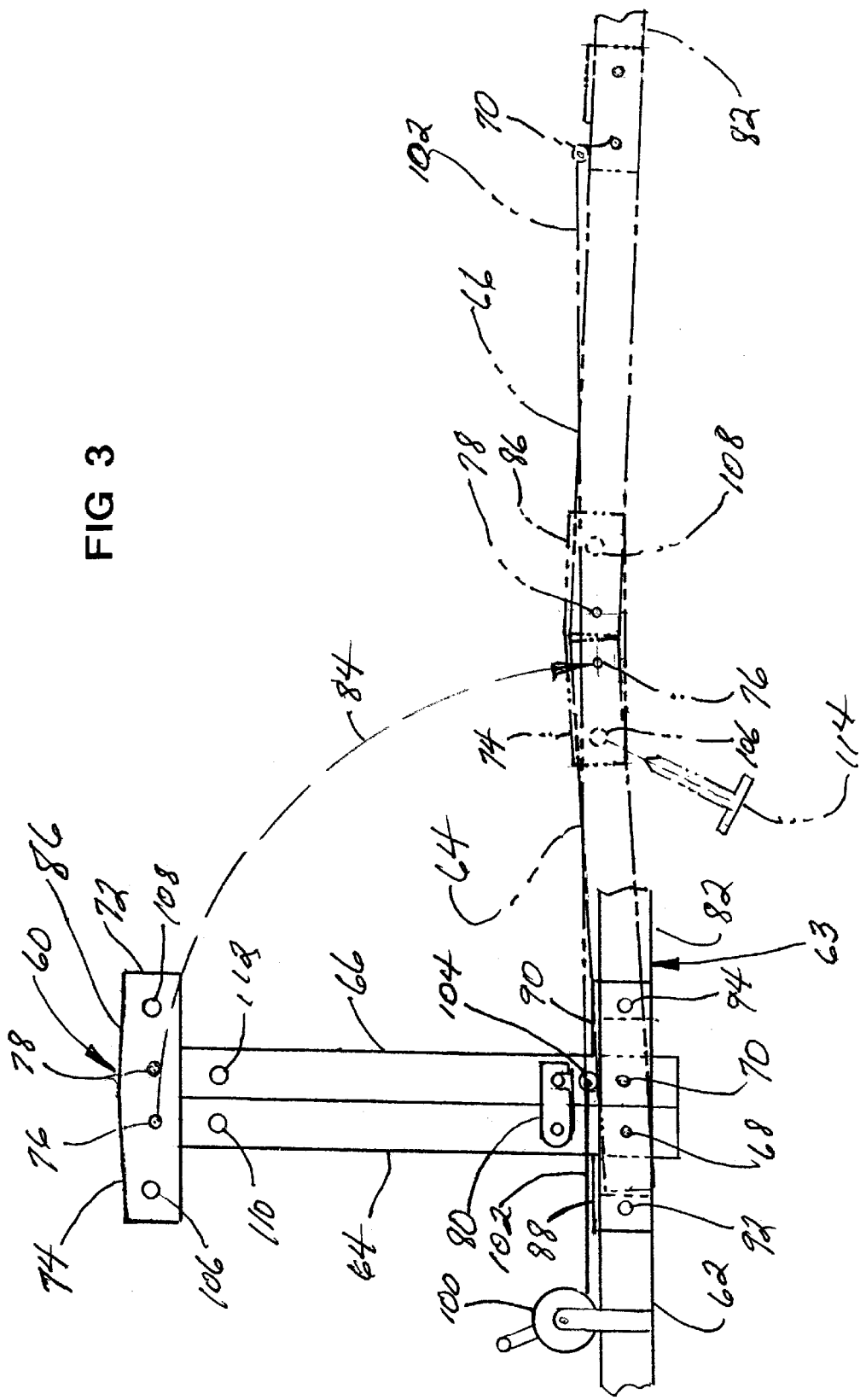
FIG. 3 is a view similar to FIG. 2 showing an alternate embodiment of the invention.

Referring now to FIG. 3, an alternate embodiment of the tongue extension is there shown generally at numeral 60. This embodiment 60 also includes elongated extension members 64 and 66 formed of straight channel material and which are pivotally connected about closely spaced transverse axes 76 and 78 to a central connecting member 74. The opposite ends of each of the extension members 64 and 66 are pivotally connected to the corresponding ends of the forward portion 62 and the rear portion 82 about pivotal connections at 68 and 70, respectively. When in the upright stored position, the extension members 64 and 66 are latched securely together by a conventional latch member 80.

To reinforce the attachment of the corresponding lower ends of the extension members 64 and 66, separate channel members 88 and 90 are securely attached by threaded fasteners at 92 and 94 to the corresponding ends of the forward portion 62 and the rearward portion 82 as shown.

Upon deployment, the central connecting member 74 pivots in the direction of arrow 84 to the fully deployed configuration shown in phantom. In this embodiment 60, the top surfaces 86 of the central connecting member 74 have been slightly angled in the range of less than 5° as shown. This slightly angled top configuration 86 of the central connecting member 74 prevents the extension members 64 and 66 from fully pivotally extending into a longitudinally straight and aligned configuration. By this arrangement, the movement from the fully deployed position shown in phantom back to the stored position shown in solid lines is more easily facilitated.

This feature may be best understood by understanding that a substantial downward weight is always applied to the trailer hitch C and the accompanying ball connector disposed at the forwardly end of the forward portion 62 (not shown in FIG. 3). Because there is substantial downward static force based upon proper balance of the boat atop the trailer, preventing the full locking movement of each of the extension members 64 and 66 upon deployment facilitates the initial movement in the opposite direction of arrow 84 back to the stored position.

Because there is this easier tendency for the unlocking of the pivotal connectors 76 and 78 which may be inadvertently triggered, for example, by the rearward movement of the tow vehicle V, a locking pin 114 disposed in each of the locking apertures 106 and 108 in the central connecting member 74 in alignment with apertures 110 and 112 of the extension members 64 and 66 is provided. The locking pins 114 are simply inserted through the locking apertures 106 and 108 shown in phantom when the tongue extension 60 is fully deployed.

To assist in the movement of the extension members 64 and 66 back to the stored position shown in solid after the locking pins 114 have been removed, a light duty winch 100 which is preferably manually operated by crank as shown, is also provided. The hook end of the flexible cable 102 is attached to an eyelet 104 connected to the top surface 86 of the central connecting member 74. By this arrangement, the cranking movement of the winch 100 both effects a smooth deployment motion in the direction of arrow 84 and likewise a smooth retrieval motion opposite to arrow 84 to the fully stored position shown in solid in FIG. 3.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A boat trailer comprising:
   a multi-wheel supported frame adapted to support, transport and launch a boat thereatop and therefrom, respectively;

an elongated substantially straight tongue member having a rear portion thereof connected to and forwardly extending from a central point and along a longitudinal axis of said frame and a forward portion adapted at a forward distal end thereof for releasable connection to a trailer hitch of a tow vehicle;

a tongue extension which, when moved from a stored configuration to a deployed configuration, extends the effective length of the tongue member during launching of the boat into the water;

said tongue extension including two elongated extension members pivotally connected together to a central connecting member about spaced transverse pivotal axes and pivotally connected at a corresponding opposite end of each said extension member between said forward portion and said rear portion;

said extension members pivotally movable in an upright plane coplanar with said tongue member between the upright side-by-side stored position and the deployed position in end-to-end fashion substantially longitudinally aligned with said forward and rear portions wherein the effective length of said tongue member is extended or lengthened by an amount substantially equal to the combined length of said extension members.

2. A boat trailer as set forth in claim 1, wherein:

said central connecting member is configured to limit relative pivotal movement of said extension members between the stored position and the deployed position.

3. A boat trailer as set forth in claim 2, further comprising:

a locking member attached to said tongue extension configured to secure said extension members in the stored position when not in use.

4. A boat trailer as set forth in claim 1, further comprising:

a caster lift wheel connected to said tongue member in close proximity to said tongue extension for lifting said tongue extensions from the deployed configuration toward the stored configuration.

5. A boat trailer as set forth in claim 1, further comprising:

a winch connected to said forward portion and having an elongated cable;

a distal end of said cable attached or attachable to a lifting eye which is rigidly attached to said rear portion whereby activation of said winch will controlledly deploy and retract said tongue extension to the stored position.

6. A boat trailer comprising:

a multi-wheel supported frame adapted to support, transport and launch a boat thereatop and therefrom, respectively;

an elongated substantially straight tongue member having a rear portion thereof connected to and forwardly extending from a central point and along a longitudinal axis of said frame and a forward portion separate from said rear portion adapted at a forward distal end thereof for releasable connection to a trailer hitch of a tow vehicle;

a tongue extension which, when moved from a stored configuration to a deployed configuration, extends the effective length of the tongue member during launching of the boat into the water;

said tongue extension including two elongated straight extension members pivotally connected together to a central connecting member about closely spaced apart transverse pivotal axes and pivotally connected at a corresponding opposite end of each said extension member to said forward portion and said rear portion;

said extension members pivotally movable between the stored upright side-by-side position and the deployed position in end-to-end fashion substantially longitudinally aligned one to another with said forward and rear portions wherein the effective length of said tongue member is extended or lengthened by an amount substantially equal to the combined length of said extension members.

7. A boat trailer as set forth in claim 6, wherein:

said central connecting member is configured to limit relative pivotal movement of said extension members between the stored position and the deployed position.

8. A boat trailer as set forth in claim 7, further comprising:

a locking member attached to said tongue extension configured to secure said extension members in the stored position when not in use.

9. A boat trailer as set forth in claim 6, further comprising:

a caster lift wheel connected to said tongue member in close proximity to said tongue extension for lifting said tongue extensions from the deployed configuration toward the stored configuration.

10. A boat trailer as set forth in claim 6, further comprising:

a winch connected to said forward portion and having an elongated cable;

a distal end of said cable attached or attachable to a lifting eye which is rigidly attached to said rear portion whereby activation of said winch will controlledly deploy and retract said tongue extension to the stored position.

* * * * *